A. W. EMERSON.
VEGETABLE CURING PLANT.
APPLICATION FILED APR. 8, 1919.

1,316,147.

Patented Sept. 16, 1919.
2 SHEETS—SHEET 2.

Inventor
A. W. Emerson
By Jacob Ashley
Attorney

UNITED STATES PATENT OFFICE.

ARTHUR W. EMERSON, OF DALLAS, TEXAS.

VEGETABLE-CURING PLANT.

1,316,147. Specification of Letters Patent. Patented Sept. 16, 1919.

Application filed April 8, 1919. Serial No. 288,473.

*To all whom it may concern:*

Be it known that I, ARTHUR W. EMERSON, a citizen of the United States, residing at Dallas, in the county of Dallas and State of Texas, have invented certain new and useful Improvements in Vegetable-Curing Plants, of which the following is a specification.

This invention relates to new and useful improvements in vegetable curing plants.

The purpose of the invention is to provide means for supplying tempered air under pressure to storage bins and there mixing it with air at atmospheric pressure either at a normal temperature or heated.

In carrying out the invention means is provided for compressing air, then tempering it and then conveying it to the storage bins. Individual distributers are disposed in each bin and a supply pipe leads from the main feed line to each distributer and includes a cut-off valve. An air mixing device is associated with the discharge of each supply pipe in the distributer for mixing air at atmospheric pressure with the compressed air. It is possible with such a method and apparatus to control the temperature of the air to a minute degree and to modulate the compressed and tempered air to the desired pressure and degree.

The invention will be more readily understood from a reading of the following specification and by reference to the accompanying drawings, in which an example of the invention is shown and wherein.

Figure 1:
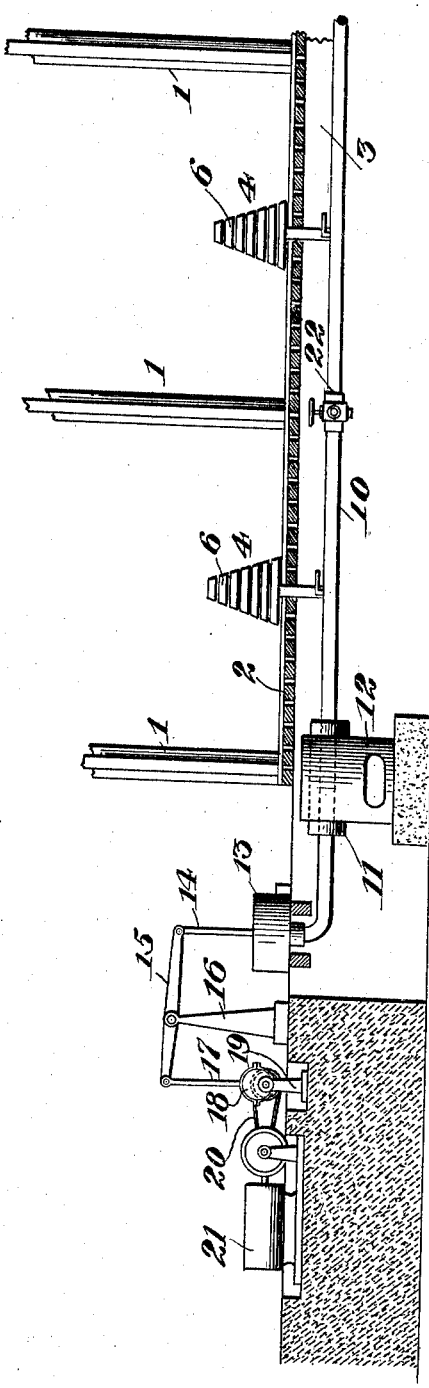
Figure 1 is a longitudinal sectional view of a portion of a plant constructed in accordance with this invention.

In the drawings the numeral 1 designates a suitably constructed storage bin having a slatted floor 2 built on joists 3. As the particular construction of the bins and curing house would be a separate invention, the details of the same have not been illustrated.

Figure 2:
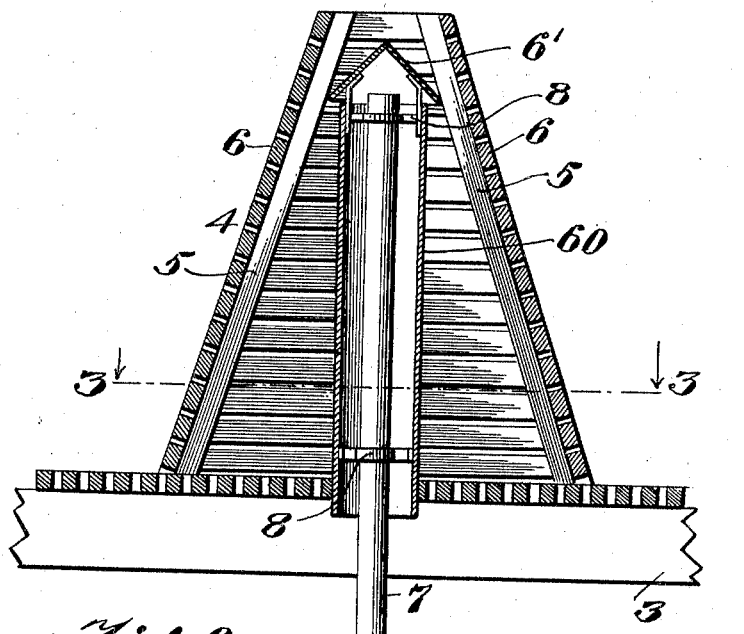
Fig. 2 is a vertical sectional view of one of the distributing and air mixing devices.
Figure 3:
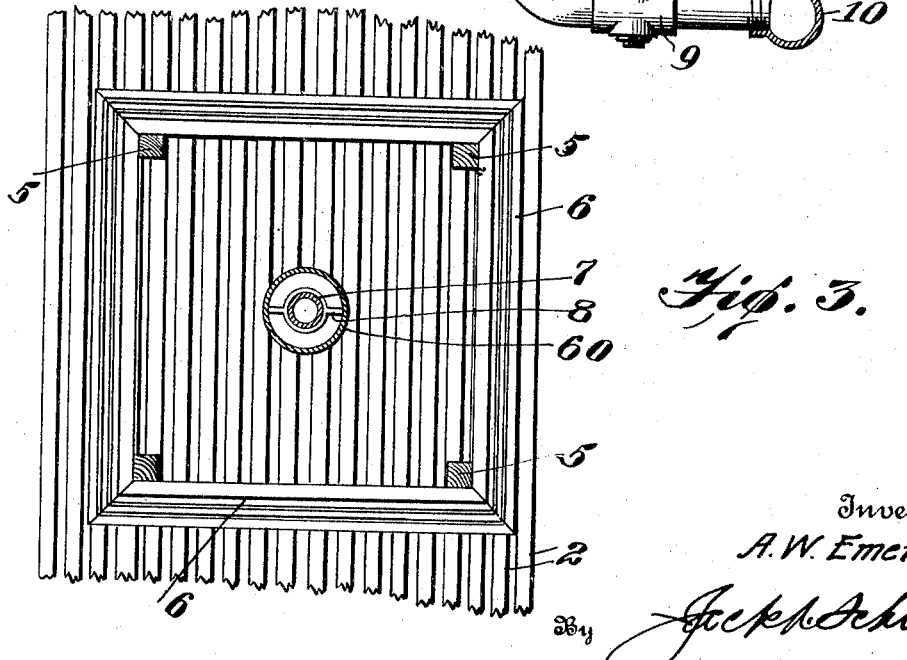
Fig. 3 is a cross-sectional view of the same on the line 3—3 of Fig. 2.

In the center of each bin a truncated distributer 4 is mounted. The distributer includes four inclined sides composed of slats 6 spaced apart to provide narrow transverse slits therebetween. The slats are fastened on corner posts 5 as shown in Fig. 2. When the bin is filled with vegetables the distributer will extend up through the center of the same so that air delivered to the distributer will be distributed laterally through the slits to the vegetables in the lower portion of the bin.

Within each distributer I arrange an air mixer or aerator including a vertical sleeve 60 extending up through the floor. A conical cap 6' spaced above the sleeve overhangs the same. A supply pipe 7 extends up into the sleeve and terminates near the cap. The sleeve and pipes are held in concentric relation by cross braces 8 within the sleeve. The supply pipe is bent at rights below the joists and includes a cut-off valve 9 having a handle lever 9'. The supply enters a feed pipe 10 of larger diameter.

The feed extends under the bins and leads from an air compressor or pump 13, but passes through a tempering drum 11 mounted in a structure 12 which may be either a furnace or a cooling device. The compressor has a piston 14 pivoted to the end of a walking beam 15 mounted in a standard 16. The opposite end of the beam is pivoted to a link 17 connected with an eccentric 18 which is mounted on a standard 19. The eccentric is driven by a belt 20 from an engine 21.

In operating the plant air is drawn into the compressor 13 and forced into the feed pipe 10 under pressure. The air passing through the pipe is heated or cooled as the case may be, by the drum 11 and this tempered and compressed air is delivered to the supply pipes 7. The supply of air from the pipe 10 to the supply pipes 7 may be regulated or cut off at each bin by the valves 9. The compressed and tempered air is discharged from the upper end of each supply pipe and creates a suction in the sleeve 6. The lower end of the sleeve is below the floor of the bin and air at atmospheric pressure is drawn into the sleeve and mixed with compressed and tempered air from the discharge pipe. This admixture is spread or deflected by the cap 6' and escapes through the slits between the slats 6 to the vegetables. The air which enters the bottom of the sleeve may be obtained from the interior of the building and will be more or less heated, or it may be obtained exteriorly in a suitable manner. The mixing of air under the two conditions recited not only enhances the circulation but permits of a temperature regulation which is highly desirable. It will be seen that even if the valve 9 was closed air would enter the sleeve and pass up the same, thus setting up a circulation. A valve 22 is included in the feed pipe 10 and by opening the same warm air may be supplied to the building.

What I claim, is:

1. In a vegetable curing plant having a storage bin and a distributer in the bin having inclined sides provided with air outlets, the combination of a vertical sleeve within the distributer, a cap above the sleeve and within the distributer, said sleeve having its lower end open to the atmosphere, and a supply pipe discharging into the sleeve for supplying tempered air thereto.

2. In a vegetable curing plant having a storage bin, means for compressing air, means for tempering the compressed air, a distributer in the bin, an air mixer in the distributer having an inlet for air at atmospheric pressure, and means for conveying the compressed and tempered air to the air mixer.

3. In a vegetable curing plant having a storage bin, means for compressing air, means for tempering the compressed air, a distributer in the bin, an air mixer in the distributer having an inlet for air at atmospheric pressure, and a valve for controlling the supply of compressed air to the air mixer.

In testimony whereof I affix my signature.

ARTHUR W. EMERSON.